US010878715B2

(12) United States Patent
Schmidt (10) Patent No.: US 10,878,715 B2
(45) Date of Patent: Dec. 29, 2020

(54) FINGER RECOGNITION SYSTEM AND METHOD FOR USE IN TYPING

(71) Applicant: Type A+ LLC, Santa Rosa, CA (US)

(72) Inventor: Barbara Schmidt, Santa Rosa, CA (US)

(73) Assignee: Type A+ LLC, Santa Rosa, CA (US)

( * ) Notice: Subject to any disclaimer, the term of this patent is extended or adjusted under 35 U.S.C. 154(b) by 577 days.

(21) Appl. No.: 15/014,999

(22) Filed: Feb. 3, 2016

(65) Prior Publication Data

US 2016/0232803 A1 Aug. 11, 2016

Related U.S. Application Data

(60) Provisional application No. 62/112,278, filed on Feb. 5, 2015.

(51) Int. Cl.
*G09B 5/02* (2006.01)
*G09B 13/00* (2006.01)

(52) U.S. Cl.
CPC .............. *G09B 13/00* (2013.01); *G09B 5/02* (2013.01)

(58) Field of Classification Search
CPC ......... G09B 13/00; G09B 13/02; G09B 13/04
See application file for complete search history.

(56) References Cited

U.S. PATENT DOCUMENTS

| 2004/0075590 A1* | 4/2004 | Pearson | G06F 21/32 341/22 |
| 2004/0113956 A1* | 6/2004 | Bellwood | G06F 3/04895 715/863 |
| 2014/0240234 A1 | 8/2014 | Bylander | |
| 2015/0135108 A1* | 5/2015 | Pope | G06K 9/00006 715/767 |
| 2015/0227216 A1* | 8/2015 | Fukumoto | G06F 3/0338 345/161 |

FOREIGN PATENT DOCUMENTS

WO  WO 2013/173838  11/2013

* cited by examiner

*Primary Examiner* — Bruk A Gerebmichael (57) ABSTRACT

A system and method for typing training are disclosed in which a fingerprint recognition system is included. The system recognizes a typist's fingers or fingerprints while the typist types the keys on a keypad such that the system determines which finger has pressed a particular key and can notify the typist when an incorrect finger is used to press a particular key. The system is well suited for tutorial typing where the typist is reinforced to use the correct finger to type each particular key. The system may be implemented using a specially designed keyboard or it may be implemented as an application.

16 Claims, 5 Drawing Sheets

FINGER RECOGNITION SYSTEM AND METHOD FOR USE IN TYPING

PRIORITY CLAIMS/RELATED APPLICATIONS

This application claims the benefit under 35 USC 119(e) and priority under 35 USC 120 to U.S. Provisional Patent Application Ser. No. 62/112,278, filed Feb. 5, 2015 and entitled "Finger Recognition System and Method for Use in Typing", the entirety of which is incorporated herein by reference.

FIELD

The disclosure relates to a fingerprint recognition system and in particular to a fingerprint recognition system for use in typing.

BACKGROUND

Currently, children as young as the second grade are regularly using the computer keyboard and 10-key pad for educational purposes (as well as for recreation). Elementary age students (as young as third grade) are now required to take standardized tests on computers. They are also required to do on-line homework for math and writing. Yet, they are assigned these tasks without being taught how to use a keyboard or a 10-key which can cause ergonomic issues with young developing hands, wrists and necks (from looking down to "hunt and peck").

In addition, since computers are used from roughly second grade into adulthood, the efficiencies achieved by learning how to type on a keyboard can reap enormous benefits from typing book reports (elementary school), to essays (high school/college) and into employment.

Furthermore, most schools are no longer teaching cursive writing. As a result, young students are being forced to move from printing to computer keyboarding (without being taught the skill). Even the schools that represent that they teach the computer keyboarding skill, these schools have many students that have not learned the skill because there is currently no effective teaching tool available.

The typing training software programs that are currently available are not effective because there is no supervision. As a result, these software programs do not know if the student is using the correct fingers, has "flying fingers", is looking down, etc. For example, using these existing typing training tools, the student could be simply using only their index fingers, for instance.

Thus, it is desirable to provide a system that provides typing training while providing feedback to the student about the typing that is not currently provided and it is to this end that the disclosure is directed.

DETAILED DESCRIPTION OF ONE OR MORE EMBODIMENTS

The disclosure is particularly applicable to a keyboard that recognizes fingerprints and the typing training system that uses that keyboard and it is in this context that the disclosure will be described. It will be appreciated, however, that the system and method has greater utility, such as to any keypad that a user may want to learn to be able to perform touch typing. For example, the keypad may be a typical QWERTY keyboard, a keyboard without key legends as shown in FIG. 5, a Dvorak modified keyboard, a virtual keyboard on a touchscreen device, other keyboards, a numeric keypad, a 10 digit numeric keypad, an electric typewriter or any other keypad on which the user can learn to touch type using the typing training system.

The system and method provide a fingerprint recognition system that may be used in typing training. In particular, the system may recognize a typist's fingerprints while the typist types the keys on a keypad such that the system determines which particular fingers of the user have hit the keys. The system is well suited for use during typing training where the typist gets feedback to use the correct fingers to type particular keys. The system may be used from classroom typing training, after-school programs, summer camps, adult schools, local business colleges, at home and any other place in which it would be beneficial to teach a user to type with feedback when the wrong fingers are being used to press a key or keys on the keypad.

Figure 1:
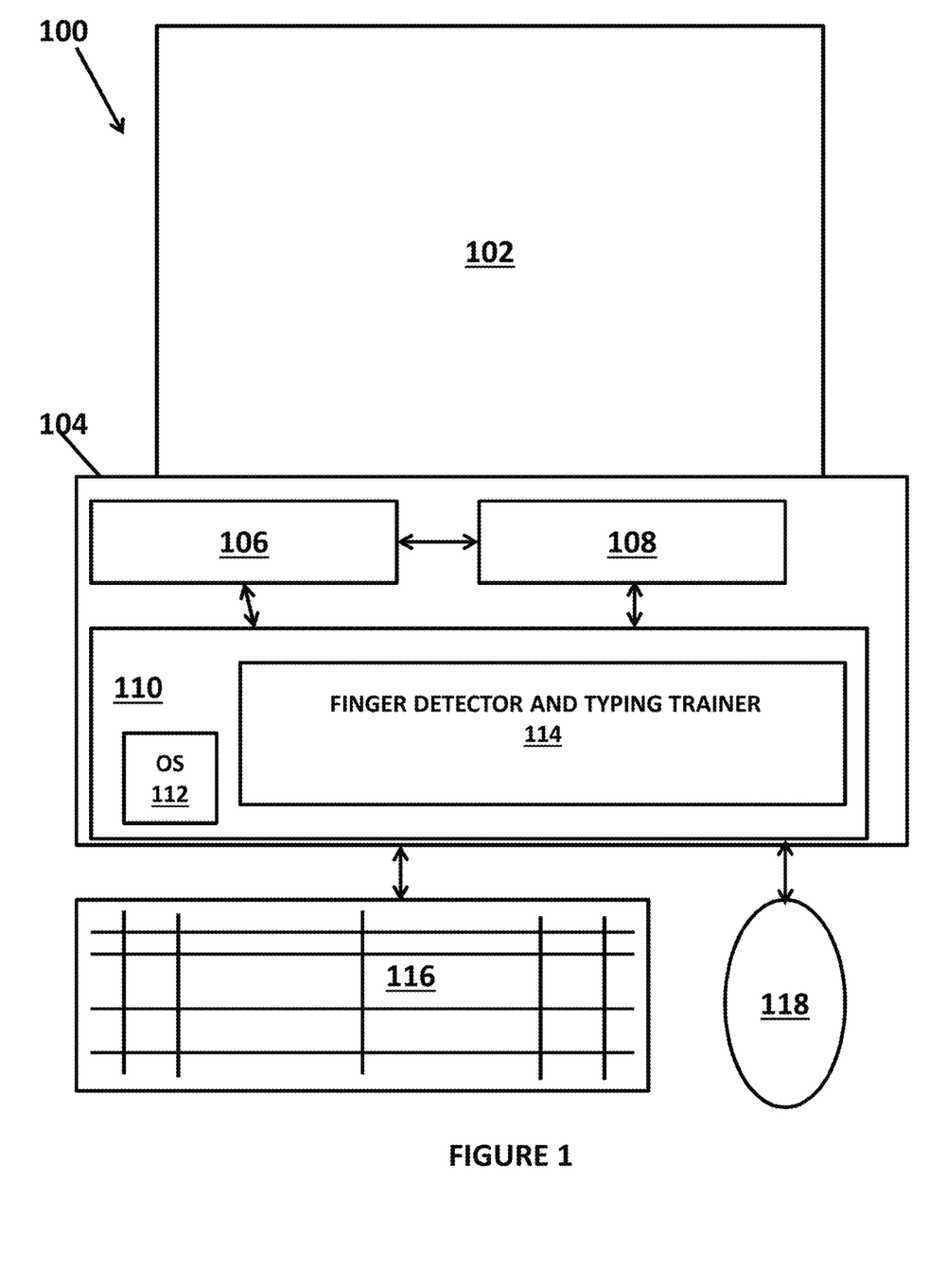
FIG. 1 illustrates an example of a first embodiment of a typing training system.
Figure 4:
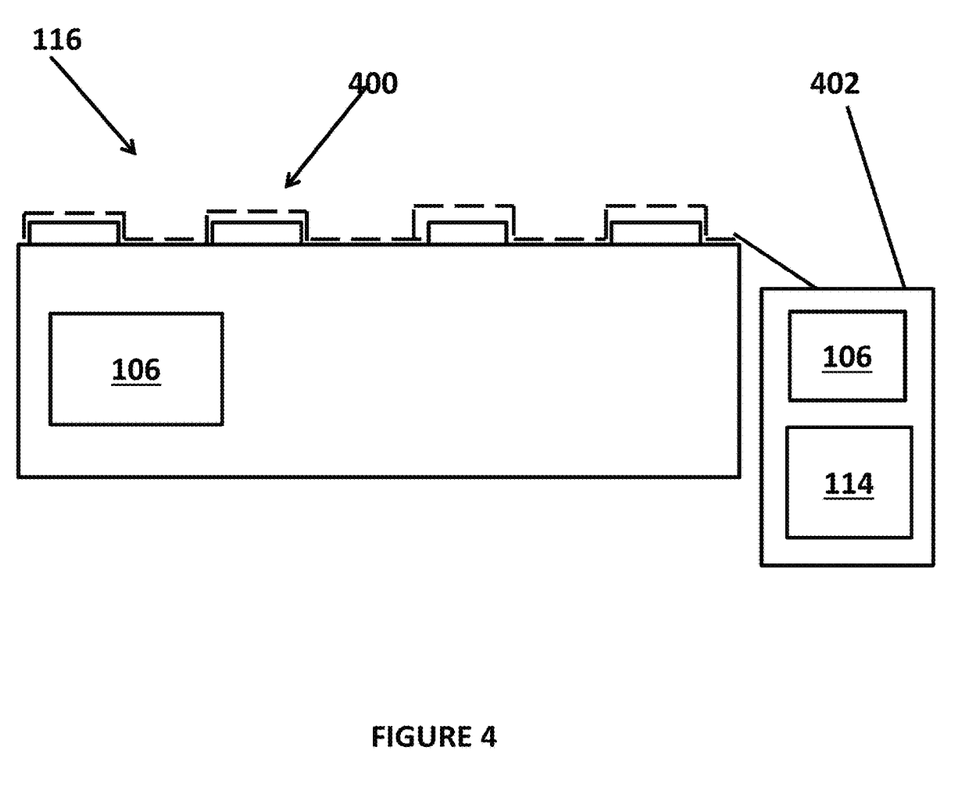
FIG. 4 illustrates an example of a third embodiment of the typing training system that may utilize an existing keypad.
Figure 5:
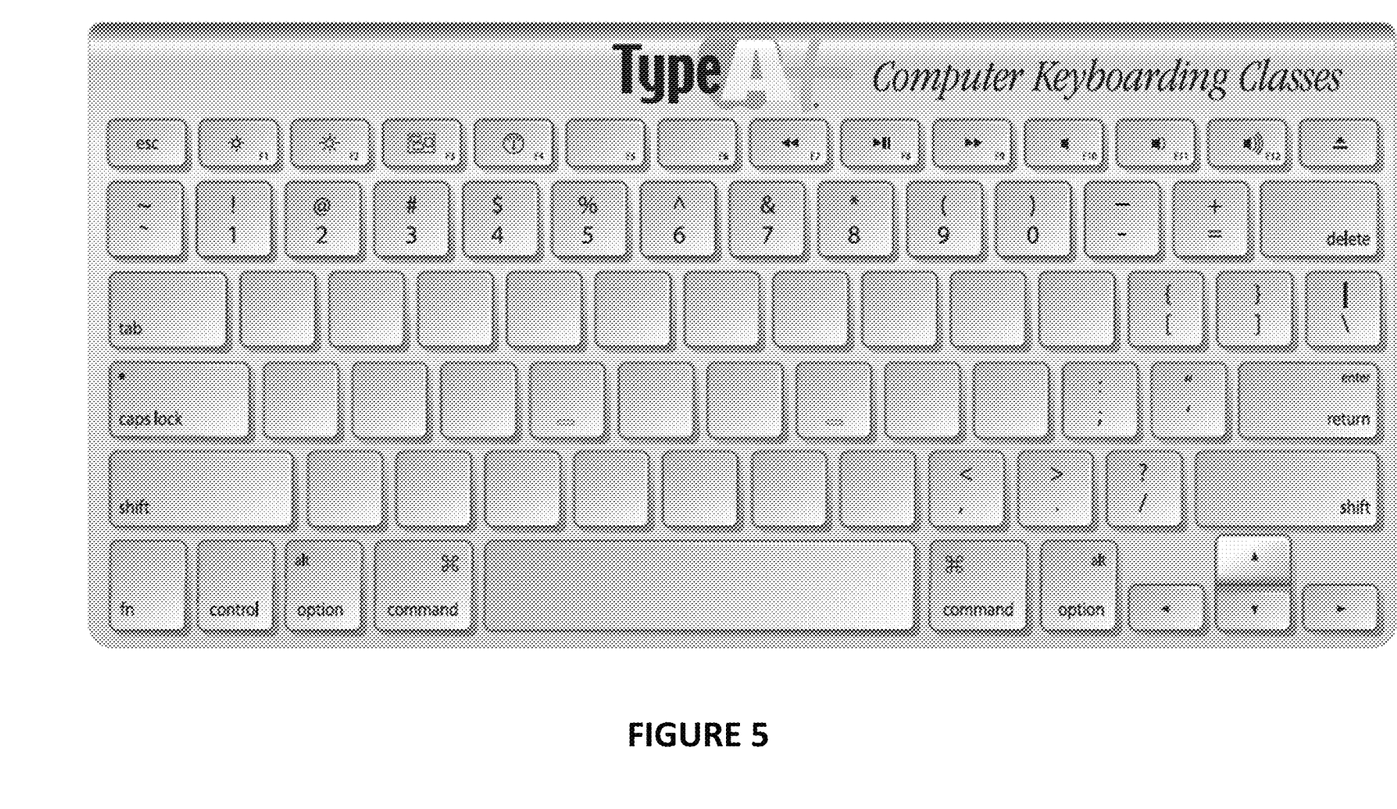
FIG. 5 illustrates an example of a keyboard that may be utilized for the typing training.

FIG. 1 illustrates an example of a first embodiment of a typing training system that may be used to teach a student of any age to type/use any type of key pad wherein the keypad may include a typical QWERTY keyboard, a keyboard without key legends as shown in FIG. 5, a Dvorak modified keyboard, other keyboards, a virtual keyboard on a touchscreen device, a numeric keypad, a 10 digit numeric keypad, an electric typewriter or any other keypad on which the user can learn to touch type. In this first embodiment, the system may have a computer system 100 having a display 102 and chassis 104 as well as a keypad 116, such as a computer keyboard in this example, and possibly other input devices like a computer mouse 118 that are connected to the computer system 100. The keypad 116 may be the keypad that the student is learning to use. The keypads in FIGS. 1 and 3-5 may be connected to the computer system using wires or wirelessly. The computer system 100 may be a personal computer, a laptop computer, a tablet computer and the like that has the typical components of a computer system. For example, as shown in FIG. 1, the computer system 100 may have at least one processor 106, a persistent storage device 108, such as a hard disk drive, flash memory, other non-volatile memory and the like and memory 110, such as DRAM or SRAM that are all connected to each other and operate like they would in known computer systems.

Figure 3:
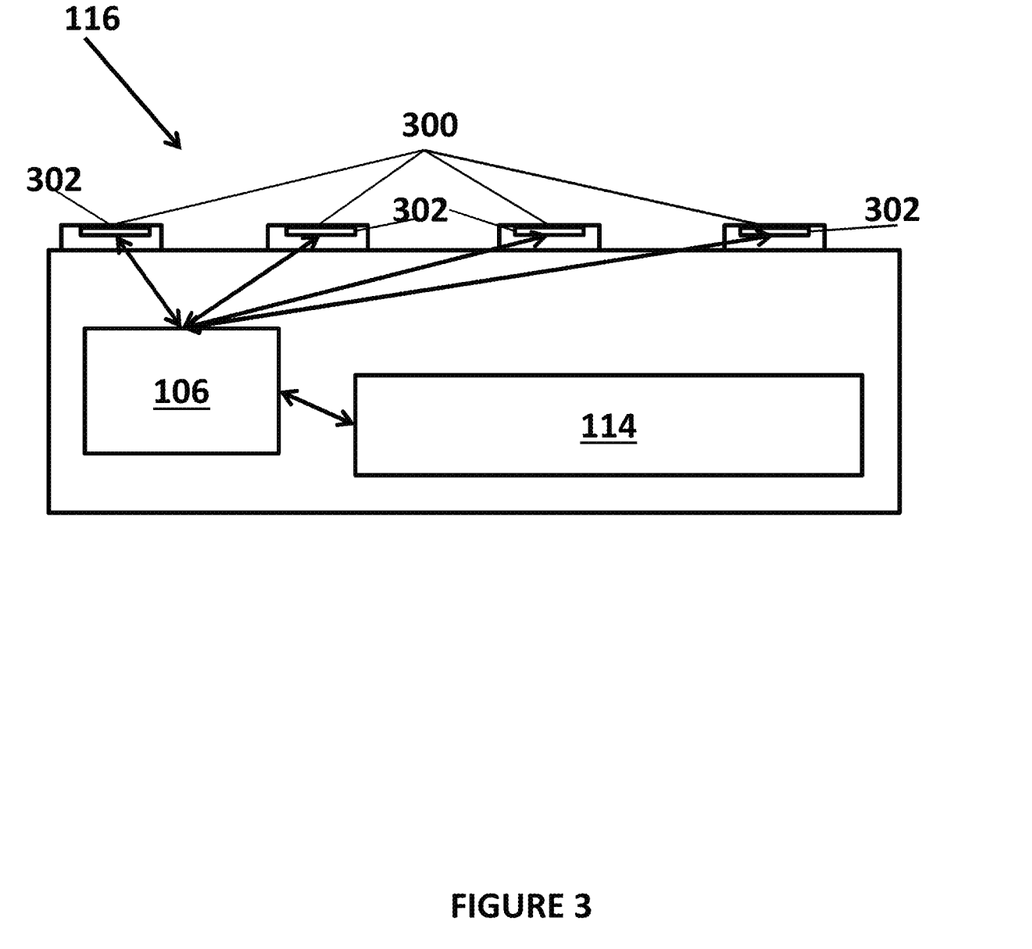
FIG. 3 illustrates an example of a second embodiment of the typing training system partially integrated into a keypad.

When being used to train the student on the keypad use, the memory 110 may further have an operating system 112, such as Windows or MacOS, that is executed by the processor and a finger detector and typing training component 114. In the embodiment in FIG. 1, the finger detector and typing training component 114 may be implemented in a plurality of lines of computer code that may be executed by the processor of the computer system such that the processor of the computer system is configured to perform the operations and functions of the finger detector and typing training component 114 as described below. In other embodiments, the finger detector and typing training component 114 may be a piece of hardware, such as a microcontroller, integrated circuit, application specific integrated circuit or programmable logic device that may implement the finger detector and typing training component 114 that may be integrated into a keypad with as shown in FIG. 3.

In operation, the finger detector and typing training component 114 may train the student to use the keypad by detecting a key press, determining the finger used to press the key and indicate to the student, such as by a user interface message, if a wrong finger is being used to press the key. The finger detector and typing training component 114 may also generate a typing training user interface that provides exercises to the student, may grade the student's typing prowess, provide pointers to the student and the like. Each key of the keypad 116 shown in FIG. 1 may have a sensor that is able to identify which finger of the student presses the key. For example, the sensor of each key may have a fingerprint recognition sensor that is implemented using semiconductor and integrated circuit technology. Thus, in combination which the already existing circuitry in the keypad that detects that a key has been pressed, the sensor can communicate data to the finger detector and typing training component 114 that a particular key was pressed by a particular finger of the user. The finger detector and typing training component 114 may be also enabled for typing training or disabled for normal typing on the keypad.

Figure 2:
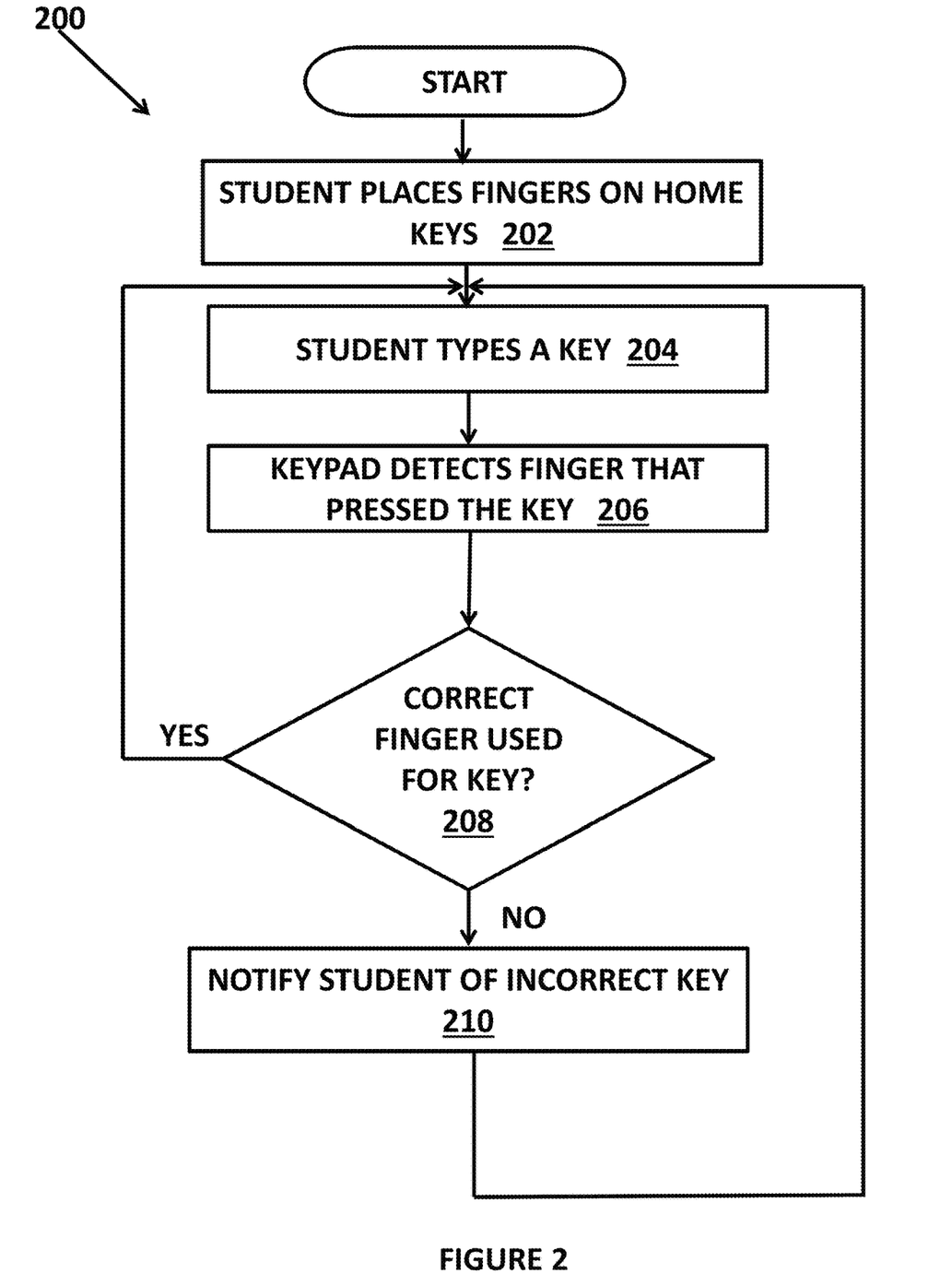
FIG. 2 illustrates a method for typing training that may be carried out of the system in FIG. 1.

FIG. 2 illustrates a method 200 for typing training that may be carried out of the system in FIG. 1. The student may initially place his/her fingers on a set of home keys of the keypad (202). For example, on a typical QWERTY keyboard:

---
Left index finger on "f"
Left middle finger on "d"
Left ring finger on "s"
Left pinkie on "a"
Right index finger on "j"
Right middle finger on "k"
Right ring finger on "L"
Right pinkie on the ":;" key

---

Once all fingers are in place, the finger detector and typing training component 114 and the sensors may recognize, in one embodiment, the fingerprint of each of the 8 fingers on the keys in the home position. In the system, a log in user name and password may be used in conjunction with each student's fingerprinting so that the fingerprints are kept secure.

Then, the remaining keyboard keys will be programmed to identify the finger which is supposed to be striking them and will be anticipating that fingerprint to strike it as follows:

---
Q, z and 1 keys - left pinkie
W, x and 2 keys - left ring
E, c and 3 keys - left middle
R, v, g, b, t, 4, 5, and 6 keys - left index
U, y, h, n, m and 7 - right index
I, 8 and <, - right middle.
O, 9 and >. - right ring
P, 0, ?/ and "" - right pinkie

---

Following the above initialization, the finger detector and typing training component 114 may store the data/information about each finger identifier, such as a fingerprint, as well as which finger of the student should be pressing each key of the keypad. Once the keypad is initialized as above, the student may press a key (204) such as during a typing/keyboarding exercise or during normal keyboard use while the finger detector and typing training component 114 is enabled. Based on the sensor signals in the key that was pressed by the student and the keypad signals that indicate which key was pressed, the system detects the finger that pressed the particular key (206). The system may then determine if the student used the correct finger to press the key (208) based on the above initializations as well as the sensor signals in the key that was pressed by the student and the keypad signals that indicate which key was pressed.

If the student pressed the key with the correct finger, then the method loops back to process 204 so that when the student presses another key, the same process above may occur. If the student presses the key with the wrong finger, the finger detector and typing training component 114 may notify the student about the use of the incorrect finger to press the key (210) such as by a user interface message, a color illumination on the keyboard or any other indication to the student that the incorrect finger was used to press the key. The typing training on the computer and in the finger detector and typing training component 114 may include a feedback loop that enables the student to re-try lessons due to the incorrect fingering. For example, a picture of a finger will appear on the computer screen when the incorrect finger is used to press a key on the keypad. The system also may keep statistical information on the accuracy of correct finger usage.

In some embodiments, the "home row keys" may be programmed to sense that each of the correct fingers have returned to home row after having reached to its non-home row key. Then, once the indication of the incorrect finger has been given to the student, the method loops back to process 204 so that when the student presses another key, the same process above may occur. Thus, the method in FIG. 3 occurs upon each key press as long as the finger detector and typing training component 114 is enabled. Thus, the system described above may provide a student with feedback about correct finger position even without teacher supervision since the system automatically detects correct and or incorrect finger presses of the keys of the keypad.

FIG. 3 illustrates an example of a second embodiment of the typing training system integrated into a keypad 116. In this embodiment, the computer system to which this keypad is connected may still contain typing training software that displays typing exercises and also provides the indication of an incorrect finger key press to the student when the finger detector and typing training component 114 is enabled. In this embodiment, the keypad 116 may have a processor 106 and a portion of the finger detector and typing training component 114 that may be implemented in software or hardware as described above. The keypad may have a plurality of keys 300 and each key may have the sensor 302 integrated into each key so that each key can identify the finger being used to press the key as described above. The position of each fingertip sensor 302 on each key (i.e. flat enough for the keypad to read the fingerprint) may be used to aid the student to quickly acquire proper hand alignment/ergonomics.

As shown in FIG. 3, the signals from each key may be passed onto the processor 106 that may determine the key being pressed and the finger pressing that key for each key press as described above using the portion of the finger detector and typing training component 114. The portion of the finger detector and typing training component 114 may then pass signals onto the computer system indicating the key being pressed and if the wrong finger is being used to press a particular key so that the typing training software on the computer may indicate the key being pressed and whether a wrong finger was being used by the student. As with the embodiment in FIG. 1, the portion of the finger detector and typing training component 114 and the sensors 302 may be enabled when the keypad 116 is being used to typical training or normal typing in which an indication of an incorrect finger being used to press a key may be indicated. The portion of the finger detector and typing training component 114 and the sensors 302 may also be deactivated.

FIG. 4 illustrates an example of a third embodiment of the typing training system that may utilize an existing keypad 116. In this embodiment, the computer system to which this keypad is connected may still contain typing training software that displays typing exercises and also provides the indication of an incorrect finger key press to the student when the finger detector and typing training component 114 is enabled. In this embodiment, the keypad 116 may have the processor 106 and the plurality of keys 300 (not numbered in this figure for clarity). In this embodiment, a typing training overlay 400 (shown by the dotted line) may contain each key sensor 302 (not numbered in this figure for clarity) and may be laid over the keypad 116 in order to convert the normal keypad 116 into a keypad 116 that may be used for typing training as described above. When laid of the keypad 116, the sensors 302 of the typing training overlay 400 may be over each key of the keypad 116. The typing training overlay 400 and the sensors 302 may be made out of various materials. For example, the typing training overlay 400 may be made of a plastic material and each sensor may be a circuit.

In the embodiment in FIG. 4, the typing training overlay 400 may be connected to an external device 402 that may have a processor 106 and the portion of the finger detector and typing training component 114 that operates as described above with reference to FIG. 3. In FIG. 4, the signals from each key and each sensor may be passed onto the processor 106 and the portion of the finger detector and typing training component 114 to determine the key being pressed and the finger pressing that key for each key press as described above using the portion of the finger detector and typing training component 114. The portion of the finger detector and typing training component 114 may then pass signals onto the computer system indicating the key being pressed and if the wrong finger is being used to press a particular key so that the typing training software on the computer may indicate the key being pressed and whether a wrong finger was being used by the student. Unlike the embodiment in FIG. 1, this embodiment may be removed from the keypad when not in use. Thus, in this embodiment, an existing keypad may be retrofitted with the typing training overlay 400 and device 402 may be used to typing training. It is understood that various different shaped/sized typing training overlays 400 would be needed to accommodate each type of keypad 116.

FIG. 5 illustrates an example of a keyboard that may be utilized for the typing training. In the example in FIG. 5, the keyboard may have sensors 302 for each key, but no visual indication of the letter keys which forces the student to memorize the key placements and not look down at the keyboard which is a common error made by students who are learning to type. The FIG. 5 keyboard may have the integrated typing training elements shown in FIG. 3. Alternatively to the keyboard with blank letter keys in FIG. 5, the keyboard may have the normal visual indication of each letter and a color code on each key to assist the student during the typing exercises. For example, all of the keys that should be pressed by a particular finger may have the same color. Alternatively, the keyboard may have the blank letter keys, but a color code on each key to assist the student during the typing exercises. For example, all of the keys that should be pressed by a particular finger may have the same color. When the colors are used as described above, the colors may align with the colors used in the typing training learning program and exercises that the student is looking at while typing their lessons. Alternatively to the keyboard shown in FIG. 5, a keyboard may have no visual indication of any key that may be used as an advanced training aid.

In addition to the implementations described above with a keyboard that tracks and identifies a user's finger press of a particular key of a keyboard, the system and apparatus may be implemented as an application running on a computing device that tracks and identifies a user's finger press of a particular key of a keyboard. More specifically, the application may have inputs from the computing device that allow the application to determine the particular keys pressed by a user on a physical keyboard or a keyboard generated on a touchscreen of a different computing device than the computing device that executes the application. In this implementation, the computing device may be a processor based device with memory, persistent storage such as flash memory, wireless or wired communication circuits and an input sensor/device for sensing the particular key(s) being pressed by the user. For example, the computing device may be a smartphone device, like an iPhone® or an Android® operating system based device, a personal computer, a laptop computer, a tablet computer and the like. In operation, the typing application may be stored on the computing device and executed by the processor of the computing device.

The application implementation may perform the same operations and functions as described above. In one embodiment, the sensor/input device to capture the information about the particular key pressed by the user may be a camera (video and/or still) or any other sensor/input device that would be capable of sensing the particular key being pressed by the user. For example, a camera may sense the finger of the user on the particular key and then the application may process that image/video of the camera to determine the particular key being pressed by the user. Further, the application embodiment may practice the process shown in FIG. 2. The application embodiment eliminates the need for a keyboard that has the sensors as shown in FIGS. 3-4.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that performs particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A typing training system, comprising:
a keypad having a plurality of physical keys;
an overlay that is removably placed on the keypad and contains a fingerprint recognition sensor for each of the physical keys of the keypad that lays on top of the keypad and each fingerprint recognition sensor senses a press of each of the physical keys of the keypad by a particular finger of a user; and
a display that generates a typing training user interface, the display showing a message when the key of the keypad is pressed by a wrong finger of the user.

2. The system of claim 1, wherein the keypad has a processor that analyzes the signals from the fingerprint recognition sensors and determines if the wrong finger of the student is being used to press a key.

3. The system of claim 1, wherein the keypad is one of a QWERTY keyboard, a keyboard without visual key indicators, a Dvorak modified keyboard, a numeric keypad, a 10 digit numeric keypad and an electric typewriter.

4. The system of claim 2, wherein the processor is integrated into the keypad.

5. The system of claim 2, wherein the processor is housed in a separate device.

6. The system of claim 1 further comprising a computing device having the keypad and the display.

7. The system of claim 6, wherein the computing device further comprises an application executed by a processor of the computing device that analyzes the signals from the fingerprint recognition sensor and determines if the wrong finger of the user is being used to press the key.

8. A keypad, comprising:
a plurality of physical keys;
an overlay that is removably placed on the plurality of physical keys and contains a fingerprint recognition sensor for each of the physical keys of the keypad that lays on top of the keypad and each fingerprint recognition sensor senses a press of each of the physical keys of the keypad by a particular finger of a user
a processor that receives the signals from the fingerprint recognition sensors and analyzes the signals from the fingerprint recognition sensors and determines if the wrong finger of the student is being used to press a key.

9. The keypad of claim 8, wherein the keypad is one of a QWERTY keyboard, a keyboard without visual key indicators, a Dvorak modified keyboard, a numeric keypad, a 10 digit numeric keypad and an electric typewriter.

10. The keypad of claim 8, wherein the processor is integrated into the keypad.

11. The keypad of claim 8, wherein the processor is housed in a separate device.

12. A computerized method for typing training, comprising:
receiving a key press from a keypad;
sensing, by a hardware fingerprint recognition sensor that is part of an overlay that is removably placed on the keypad, the key press by a particular finger of a user;
determining if the key was pressed by a wrong finger of the user; and
notifying the user when the wrong finger of the user pressed the key.

13. The method of claim 12, wherein determining if the key was pressed by a wrong finger of the user further comprises analyzing, by a processor in the keypad, the signals from the fingerprint recognition sensor and determines if the wrong finger of the user is being used to press a key.

14. The method of claim 12, wherein the keypad is one of a QWERTY keyboard, a keyboard without visual key indicators, a Dvorak modified keyboard, a numeric keypad, a 10 digit numeric keypad and an electric typewriter.

15. The method of claim 12, wherein determining if the key was pressed by a wrong finger of the user further comprises using an application executed by a processor of a computing device that analyzes the signals from the fingerprint recognition sensor and determines if the wrong finger of the student is being used to press the key.

16. The method of claim 12 further comprising displaying a message when a key of the keypad is pressed by a wrong finger of the user.

* * * * *